United States Patent Office 3,221,706
Patented Dec. 7, 1965

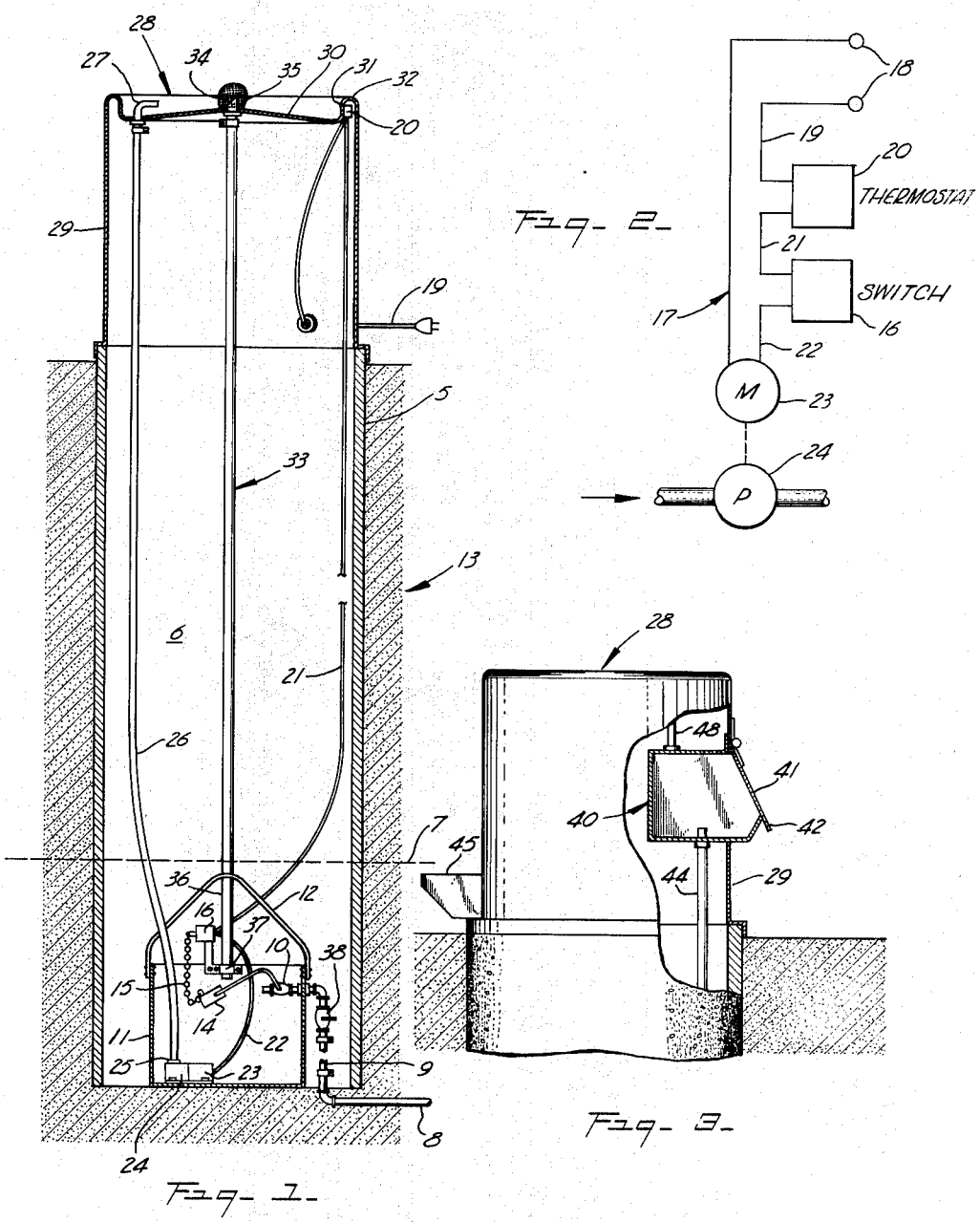

3,221,706
CIRCULATING LIVE-STOCK WATERING SYSTEM
Glenn J. Johnson, Rte. 2, Powell, Wyo.
Filed Apr. 4, 1963, Ser. No. 270,759
14 Claims. (Cl. 119—73)

This invention relates to live-stock watering systems. More particularly, it relates to live-stock watering systems of a circulating type and designed to prevent freezing-up while in use during winter months.

Provision of water during winter months, particularly in the range areas where cattle are not sheltered in buildings provides a difficult problem for the live-stock owners in such areas where the temperature drops to relatively low levels. The most common problem has been that the water system freezes and there is a consequent complete failure thereof. My invention is designed to obviate this problem. In addition, during the warmer months there is a tendency for algae to form within the watering trough and thereby making the water less palatable. My invention is also designed to obviate this problem.

It is a general object of my invention to provide a novel and improved live-stock watering system.

A more specific object is to provide a novel and improved live-stock watering system which is simple and inexpensive to manufacture, assemble, and operate.

A still more specific object is to provide a novel and improved live-stock watering system which can be used without attention and with assurance of satisfactory operation during even extremely low temperature conditions.

Another object is to provide a novel and improved live-stock watering system which recirculates the water which it utilizes and agitates the same while so doing to more effectively prevent the water from freezing.

Another object is to provide a novel and improved live-stock watering system designed to operate so as to introduce air into the water while recirculating the same and thereby more effectively prevents the water from freezing.

Another object is to provide a novel and improved live-stock watering system which recirculates the water from an underground water supply disposed below the frost line and constantly returns the same thereto.

Another object is to provide a novel and improved recirculating live-stock water system which is designed to effectively prevent the formation of algae in the drinking bowl or container.

Another object is to provide a novel and improved recirculating live-stock watering system which recirculates the water from an underground water supply disposed below the frost line and which may be quickly and easily brought to the surface for repair or servicing.

Another object is to provide a novel and improved live-stock watering system designed to provide continuous non-freezing water facilities simultaneously for live-stock of both the larger and smaller sizes.

These and other objects and advantages of my invention will more fully appear from the following description, made in connection with the accompanying drawings, wherein like reference characters refer to the same or similar parts throughout the several views, and in which:

FIG. 1 is a vertical sectional view of the pit, hood member, drinking bowl, and water supply container with the water circulating mechanism shown in side elevation.

FIG. 2 is a schematic diagram showing the electric circuit system utilized to circulate the water in my live-stock watering system.

FIG. 3 is a side elevational view with portions thereof broken away of a modification of my basic live-stock watering system, showing an auxiliary watering bowl provided for smaller live-stock such as hogs, etc.

The preferred embodiment of my invention as shown in FIGS. 1–2 includes a tubular member 5 which defines a pit 6 formed in the earth and extending below the frost line thereof which has been indicated by the broken line 7. A pressurized water line 8 is also provided below the frost line 7 and, as best shown in FIG. 1, it extends into the pit 6 and is connected by a high pressure rubber hose 9 with a valve 10 that is secured to a container 11 and communicates with the interior thereof. A bale 12 is provided for the container 11 to facilitate removal of the container from the pit when the same is desired. The hose 9 is of greater length than the depth of the pit 6 so that the container 11 may be lifted to an elevation above the surface of the earth (which is indicated by the numeral 13) whenever the same is desired. The excess length of the hose 9 when the container 11 is disposed at the bottom of the pit 6 is wrapped around the container 11 and this is easily accomplished by merely rotating the container 11 about its vertical axis.

A float member 14 is connected to the valve 10 in controlling relation and is also connected by a chain 15 to a normally closed switch 16 that is mounted upon the walls of the container 11. This switch 16 is interposed within an electric circuit system indicated generally by the numeral 17 as shown in FIG. 2.

A source of electric power indicated by the numeral 18 is connected by a line 19 to a thermostat 20. This thermostat 20, as best shown in FIG. 1, is disposed against the side walls of the drinking bowl which will be more fully described hereinafter. The thermostat 20 is further connected by an electric line 21 to the switch 16. The switch 16 is electrically connected by line 22 with the motor 23 which is provided to drive a pump 24. The motor 23 is obviously of the submersible type since it is disposed within the container 11 which is constantly maintained in at least a partially filled condition through operation of the valve 10 and the float 14.

The pump 24 has a conventional intake (not shown) which is in communication with the interior of the container 11 and has a discharge 25 that is connected with an elongated supply conduit 26 that extends upwardly and terminates in a discharge nozzle 27. As best shown in FIG. 1, the upper end of the supply conduit 26 is secured and extends through the bottom of a drinking bowl which has been indicated generally by the numeral 28. Superimposed on the tubular member 5 and covering the same is an upright housing member 29. This housing member 29 supports the water bowl or container member 28 at its upper end and maintains the same in elevated relation to the container 11. It is obvious that the water bowl 28 may be a separate member supported by the housing 29 or it may be formed integrally therewith as is the case in FIG. 1. As shown, the water bowl 28 has a bottom 30 and upstanding side walls 31 which have upper edges that preferably extend above the discharge 27 of the supply conduit 26.

Also secured to the drinking bowl 28 and extending downwardly therefrom is a return-flow conduit 33 which has an inlet 34 that is defined by a beveled end portion 35, the bevel of the end portion being disposed so as to face toward the discharge 27 of the supply condit 26 so that as the water is discharged from the discharge 27, it will be directed against the beveled end of the conduit 33. It will be noted that the beveled end portion 35 is disposed at approximately the same elevation as the discharge 27 of the supply conduit 26 to insure that the water discharged by the discharge 27 will strike against the beveled end portion of the return-flow conduit 33. The lower end portion 36 of the conduit 33 discharges into the container 11 and is secured thereto by a guide bracket 37.

A manual valve 38 is provided in the water supply line to facilitate maintenance and repair of the float and valve system comprised of the elements 10 and 14.

I have also provided an auxiliary or second watering bowl 40 which is preferably disposed at a lower elevation than the water bowl 28. As best shown in FIG. 3, this second bowl 40 is disposed within the housing member 29 and is provided with a door member 41 that is hingedly connected to the housing member and hangs in depending relation across the opening of the bowl 40. The lower edge of the door 41 extends beyond the opening defining portion of the bowl 40 to provide a lip member 42 that may be engaged by the snout of a hog or other animal to lift the cover member 41 and permit the animal to drink from the interior of the bowl 40 and to close again of its own weight once the animal has finished drinking to thereby conserve the heat of the water and effectively prevent freezing within the water bowl 40 during extreme cold weather conditions. A branch conduit 48 connects the first bowl 28 with the second bowl 40 and this may be accomplished by either connecting the branch conduit to the return-flow conduit 33 or by connecting the same directly to the bottom of the bowl 28 in a manner similar to that in which the return-flow conduit 33 is so connected. When this has been done the conduit 48 discharges into the interior of the bowl 40 as seen in FIG. 3. A second conduit 44 is connected to the bottom of the bowl 40 and discharges into the container 11 in the same manner as the return-flow conduit 33. In fact, it may be connected with the return-flow conduit 33 or extend directly into the container 11.

A step member 45 is preferably provided at the exterior of the housing member 29 to enable live-stock of intermediate size to step thereupon and thereby facilitate drinking from the bowl 28.

From the above it can be seen that I have provided a novel, simple, and inexpensive circulating live-stock watering system which will insure the provision of a continuous supply of running water despite extreme cold weather conditions. Since the container 11 is disposed well below the frost line as is the pressurized water supply line 8, the container 11 will always be at least partially filled, the level of the water being regulated cooperatively by the float 14 and the valve 10 since the elevation of the float 14 by the water as the level thereof rises will function to close the valve 10 in the conventional manner. The pump 24 will continuously pump a supply of water through the supply conduit 26 and cause the same to be discharged in a rapidly moving flow through the discharge 27 against the beveled end portion 35 of the return-flow conduit 33. In this manner, the water within the bowl 28 will be agitated as will the water which is discharged through the discharge member 27 for upon striking the beveled end portions 35 which defines the inlet 34, the water will be directed upwardly and laterally in different directions with consequent bubbling and turbulence which of itself tends to preclude freezing of water in the watering bowl 28 for it is well established that moving water will withstand much lower temperatures without freezing than will relatively calm water. In addition, the agitation which is induced into the flow of water causes air to be mixed with the water and thereby further reducing the likelihood of freezing of the water in extremely cold conditions for again, it is well established that the introduction of air into water lowers the freezing point thereof.

As a direct consequence of the above, it will be seen that there will be maintained a constant fresh supply of water within the watering bowl 28 and if the supply is not utilized, the return-flow of the water will descend through the return-flow conduit 33 and be discharged into the container 11. Thus, the water is recirculated repeatedly by the pump 24 unless it is consumed by the live-stock. The constant recirculation of the water precludes freezing thereof and thus my watering system will operate successfully under extremely cold conditions.

The chain member 15 and the switch 16 are provided in order to preclude the possibility of the pump being run dry should something occur to the supply line 8 or should the valve 10 malfunction. It will be readily seen that if the level of the water within the container 11 is depleted sufficiently far, the float will descend and the chain 15 will open the normally closed switch 16 to thereby cut off the supply of electric power to the motor 23.

It will be seen that the housing 29 cooperatively functions with the tubular member 5 by holding the air therewithin from escaping and consequently conserving the heat which is constantly being brought into the interior of the pit 6 by the water as it is introduced through the supply line 8. In addition, the heat which is provided by the earth below the frost line 7 constantly warms the air within the tubular member 5 so that as a result of normal convection, the temperature within the hood member 29 and the tubular member 5 will constantly remain above the freezing level of water.

In the event it is desired to service or repair any portion of the circulating system, this may be readily accomplished by removing the hood member 29 and engaging the bale 12 of the container 11 with a rod having a hook at the lower end thereof (not shown) and drawing the container 11 to a level above the surface of the soil. The elongated flexible hose 9 makes it possible for the entire unit to be drawn to the surface at which position it may be relatively easily repaired and serviced.

The function of the thermostat 20 is to preclude the possibility of damage to the pump 24, etc. in the event that rarely extreme weather conditions or other malfunction might result in freezing of water within the bowl 28. The thermostat 20 is set so that in the event the temperature of the upstanding wall 31 reaches a sufficiently low level for such phenomenon to take place, the electric circuit will be broken by the thermostat 20 to thereby cut off the motor 23 and the pump 24 until such time as the situation is discovered and corrected.

It will be noted that a screen member 46 may be disposed, as shown, over the upper end of the return conduit 33 to prevent the return of straws, etc. into the supply of water in the container 11 in the event such are blown into the water bowl 28 by wind or are dropped thereinto by the live-stock which may drink with grass, etc. in their mouths. The usage of such a screen, however, is not considered necessary to the successful operation of my watering system.

The constant agitation of the water, as hereinbefore described, is also very effective to prevent the formation of undesirable algae, etc. such as normally occurrs in watering troughs where the water is relatively calm. Also, during the warmer or summer months it is possible to remove the valve 10 and the float member 14 from the position shown in FIG. 1 and to secure the same to the upper end of the supply conduit 26 so that the float and valve member will be disposed within the water bowl 28 as is conventional. When this is done, the discharge of the supply conduit 26 is turned so as to direct the same against the side of the water bowl 28 so as to get increased benefits from the circulation in preventing the formation of algae. If desired, the supply conduit 26 may in the summer months be disposed more centrally such as the position which is shown for the return-flow conduit 33.

FIG. 3 shows an auxiliary watering bowl designed for usage by hogs, etc. which have insufficient height to drink from the watering bowl 28. The animal merely utilizes his snout to lift the door member 41 by engaging the lift 42 and thrusting its head into the interior of the water bowl 40. Since the upper end of the conduit 44 extends a slight distance above the bottom of the bowl 40, there will always be a supply of water maintained available for such animals.

What is claimed is:
1. A recirculating live-stock watering system comprising:
  (a) a pit-defining member disposed within the soil below the upper surface thereof and defining a pit therein to a depth well below the frost line thereof,
  (b) a pressurized water supply line also disposed below said frost line and extending into said pit,
  (c) a container disposed within said pit below the frost line, and being removable from said pit,
  (d) means carried by said container for removing the same from said pit to a point above the surface of the soil,
  (e) elongated flexible conduit means connecting the interior of said container with said pressurized water supply line and discharging into said container and permitting said container to be removed from said pit without being disconnected from said pressurized water supply line,
  (f) valve means connected with said elongated flexible conduit means and controlling the flow of water therethrough into said container,
  (g) float means disposed within said container and connected to said valve means in controlling relation to regulate the depth of water to be maintained within said container,
  (h) a pump disposed within said container and having an intake communicating with the interior thereof and having a discharge outlet,
  (i) a submersible electric motor connected to said pump in driving relation and disposed within said container,
  (j) an electric circuit system connected to said motor and providing electric power thereto to drive the same,
  (k) a switch interposed within said electric circuit system for opening and closing the same,
  (l) depth-responsive control means extending between said float and said switch in connected and controlling relation to the latter to cause the same to open said circuit system when said float descends below a predetermined level,
  (m) a hood member superimposed relative to said pit-defining member and extending upwardly over the pit in covering relation,
  (n) a watering bowl member carried by said hood member in elevated relation to said container and having a bottom and side walls,
  (o) a supply conduit connected to the discharge of said pump and extending between said container and said bowl and having a discharge disposed within said bowl
  (p) a return-flow conduit extending between said bowl and said container and having an inlet disposed within said bowl above the bottom thereof and having a discharge discharging into said container.

2. The structure defined in claim 1 wherein the discharge of said supply conduit is disposed adjacent to and at substantially the same level as the inlet of said return flow conduit and is directed thereagainst.

3. A recirculating live-stock watering system comprising:
  (a) a container disposed within the soil below the frost line thereof,
  (b) means connected to said container for maintaining a supply of water within said container at all times,
  (c) a watering bowl disposed in elevated relation to said container and having a bottom and side walls with upper edges,
  (d) pump means connected with the interior of said container and the supply of water therein and having a discharge,
  (e) supply conduit means connected with the discharge of said pump means and terminating within said bowl and having a normally open discharge discharging the entire flow of said conduit into said bowl, and
  (f) return-flow conduit means extending between said bowl and said container and having an inlet disposed within said bowl above the bottom and below the upper edges thereof and having a discharge discharging into said container.

4. The structure defined in claim 3 wherein said discharge of said supply conduit means is adjacent to and directed against said inlet of said return-flow conduit means.

5. The structure defined in claim 3 wherein said discharge of said supply means is directed transversely of said bowl toward and against the side walls thereof.

6. The structure defined in claim 3 wherein said inlet of said return-flow conduit means is disposed adjacent the center of said bowl and said discharge of said supply conduit means is disposed adjacent more peripheral portions of said bowl and is directed toward said inlet of said return-flow conduit means.

7. The structure defined in claim 3 and
  (g) a tubular member defining an opening in the soil and extending downwardly from the upper surface thereof to a level well below the frost line thereof,
  (h) said container being disposed within the lower portions of said tubular member, and
  (i) a hood member connected with upper end portions of said tubular member and extending upwardly therefrom and supporting said bowl in said elevated position and serving to conserve the heat carried by the water from said water supply means to thereby maintain the temperature of the water within said container at a level above freezing.

8. The structure defined in claim 3 wherein said return-flow conduit means has a bore having a cross-sectional area approximately at least twice the cross-sectional area of the bore of said supply conduit means.

9. The structure defined in claim 3 wherein said discharge of said supply conduit means is disposed at approximately the same level as said inlet of said return-flow conduit means and is directed thereagainst, said return-flow conduit means having a beveled upper end portion defining its said inlet with the bevel thereof facing the discharge of said supply conduit means whereby the water discharged thereagainst by said supply conduit means is agitated and air is introduced thereinto to more effectively preclude freezing of the water in said bowl during cold weather conditions.

10. The structure defined in claim 3 wherein said container is removable to a position above the surface of the soil and said means for maintaining a supply of water within said container includes an elongated flexible conduit permitting said container to be so removed without necessitating disconnection thereof from said water supply means.

11. The structure defined in claim 3 wherein said means for maintaining a supply of water within said container includes float and valve means for controlling the flow of water into said container as needed and preventing overflow of the same and including a source of pressurized water connected to the valve of said float and valve means in water-supplying relation,
  (g) said float and valve means being readily detachable from said source of pressurized water and being readily attachable within said bowl to the discharge of said supply conduit means and said supply conduit means being readily connectable to said source of pressurized water whereby said recirculating system may be readily converted into a non-circulating watering system for use as such during the warmer months of the year.

12. The structure defined in claim 11 wherein said pump means includes a pump driven by an electric motor and an electric circuit by means of which electric power is provided to said pump, (h) an electric switch interposed within said circuit and
(i) control means extending between said switch and the float of said float and valve means in controlling relation to said switch, said control means being responsive to the elevation of said float whereby the electric power provided to said pump will be shut off when the water within said container recedes to a predetermined level.

13. A recirculating live-stock watering system comprising:

(a) a pit defining member disposed within the soil below the upper surface thereof and defining a pit therein to a depth well below the frost line thereof,
(b) a pressurized water supply line also disposed below said frost line and extending into said pit,
(c) a container disposed within said pit below the frost line and being removable from said pit,
(d) elongated flexible conduit means connecting the interior of said container with said pressurized water supply line and discharging into said container and permitting said container to be removed from said pit without being disconnected from said pressurized water supply line,
(e) valve means connected with said elongated flexible conduit means and controlling the flow of water therethrough into said container,
(f) float means disposed within said container and connected to said valve means in controlling relation to regulate the depth of water to be maintained within said container,
(g) a pump disposed within said container and having an intake communicating with the interior thereof and having a discharge outlet,
(h) a submersible electric motor connected to said pump in driving relation and disposed within said container,
(i) an electric circuit system connected to said motor and providing electric power thereto to drive the same,
(j) a hood member superimposed relative to said pit-defining member and extending upwardly over the pit in covering relation,
(k) a watering bowl member carried by said hood member in elevated relation to said container and having a bottom and side walls,
(l) a supply conduit connected to the discharge of said pump and extending between said container and said bowl and having a discharge disposed within said bowl, and
(m) a return-flow conduit extending between said bowl and said container and having an inlet disposed within said bowl above the bottom thereof and having a discharge discharging into said container.

14. A recirculating live-stock watering system comprising:

(a) a container disposed within the soil below the frost line thereof;
(b) means connected in fluid communicating relationship with said container for maintaining a supply of water within said container at all times;
(c) a watering bowl disposed in elevated relation to said container and having a bottom and side walls with upper edges;
(d) pump means connected with the interior of said container and the supply of water therein and having a discharge;
(e) supply conduit means connected with the discharge of said pump means and terminating within said bowl and having a normally open discharge discharging the entire flow of said conduit into said bowl; and
(f) return flow conduit means extending between said bowl and said container and having an inlet disposed within said bowl above the bottom and below the upper edges thereof and having a discharge discharging into said container.

References Cited by the Examiner

UNITED STATES PATENTS

| | | | |
|---|---|---|---|
| 920,781 | 5/1909 | Simmons | 119—74 |
| 2,490,824 | 12/1949 | Meisner | 119—80 |
| 2,511,721 | 6/1950 | Langenbahn | 119—73 |
| 2,706,966 | 4/1955 | Cline | 119—74 |
| 3,049,094 | 8/1962 | Smith | 119—73 |

SAMUEL KOREN, *Primary Examiner.*

HUGH R. CHAMBLEE, *Examiner.*